R. Hinton,
Furniture Caster.
Nº 9,464.  Patented Dec. 14, 1852.

UNITED STATES PATENT OFFICE.

ROBERT HINTON, OF ROXBURY, MASSACHUSETTS.

MANUFACTURE OF BALL-CASTERS.

Specification of Letters Patent No. 9,464, dated December 14, 1852.

*To all whom it may concern:*

Be it known that I, ROBERT HINTON, of Roxbury, in the county of Norfolk and State of Massachusetts, have invented an Improved Ball-Caster for the Legs of Pianofortes or Various other Articles of Furniture; and I do hereby declare that the same is fully described and represented in the following specification and the accompanying drawings, letters, figures, and references thereof.

Figure 1:
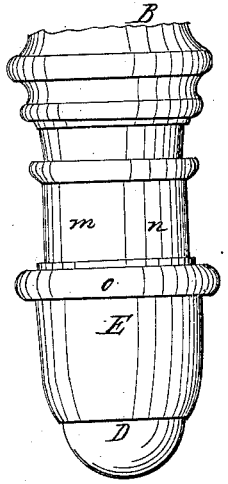
Figure 3:
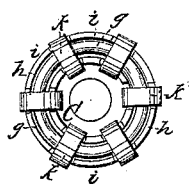
Figure 2:
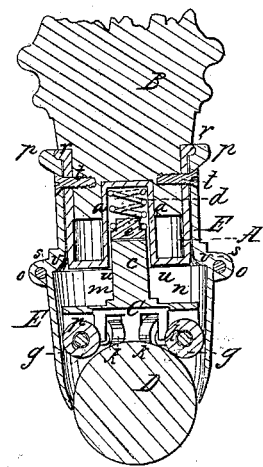

Of the said drawings Figure 1 denotes a side view or elevation of my improved caster. Fig. 2 is a central and vertical section of it. Fig. 3 is an underside view of the friction bearers.

A Fig. 2 represents a metallic socketed ferrule to be fitted on the lower end of a pianoforte or table leg B. It is provided with a cylindrical socket $a$ made of a diameter just large enough to receive a round or cylindrical shank $c$ of the bearer C. Previous to the introduction of the shank into the socket a coiled or helical spring $d$ is placed in the socket, and between the spring and the end of the shank there may be a small button or disk $e$.

The bearer C is a flanched plate or frame or head made to receive a series of small friction wheels $k$, $k$, $k$, &c., which are arranged in radial directions around within it and made to rotate freely on a ring $g$ that is embedded in a groove $h$ made in the flanch $i$, $i$, the flanch being suitably cut out to receive the friction wheels. The ball or metallic sphere D rests against these friction wheels.

The whole is inclosed within a case E that is made in two halves $m$, $n$, each of which is formed with a semicircular curved lip $o$ that extends out from the external surface of each half of the case as seen in Fig. 2.

The upper part of the case has groove $p$ made around in it and so as to receive a flanch or projection $r$ that is extended from and around the upper part of the socketed ferrule A.

Figure 4:
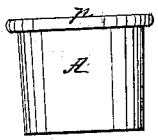
Figure 5:
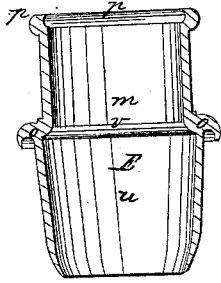

In Fig. 4 an external view of the socketed ferrule is given, while in Fig. 5 we have an inside view of one of the halves of the case. At the lower part of the case it is curved inward so as to clasp and retain the ball within it.

In confining the case to the ferrule after the ball and bearer have been put in place the two halves of the case are placed on the ferrule so as to encompass it and come together as seen in Fig. 1. This done a metallic or iron ring $s$ is passed over the lower part of the case and made to encircle it and is pressed into the groove formed by the curved lip $o$. This done the curved lip is to be burnished down over the ring so as to firmly hold it in place. Where the edges of the two halves of the case come together the outer surfaces of the two halves of the case may be burnished down so as to make a close joint, one scarcely perceptible to the eye. One or more screws $t$, $t$, inserted through the case and ferrule and screwed into the leg on which the ferrule is placed serve to hold the caster to the leg.

As ball casters have generally been made the neck of the case had to be constructed large enough to allow the ball to be passed down through it. Consequently the size or diameter of the ball became limited within the size or inner diameter of the neck. The larger the ball is made the less chance there is of its indenting or marking a floor when the article to which its caster may be fixed is moved on the ball.

As a general thing the diameter of a ball has been limited to a size less than that of the table or other leg where it is inserted in the socket or neck.

By making the case of two parts or halves $m$, $n$, a chamber $u$ of a diameter greater than that of the neck may be formed below the neck $v$ so as to receive a larger ball.

By the employment of a helical spring in the socket piece the ball is enabled to adjust itself to the irregularities of a floor so as to cause an article of furniture to the leg of which such casters may be attached to preserve steadiness on an uneven floor. The spring also allows the ball to recede from the lower end of the case so as to relieve the ball in a great measure if not entirely from friction which might otherwise tend to retard its revolutions.

I claim—

The improvement in making the case of the ball caster, viz, of a combination of two halves or parts $m$, $n$, the curved lip $o$ and the ring $s$ as constructed and applied together and to the leg or socket ferrule thereof substantially in manner and for the purpose as above set forth.

In testimony whereof I have hereto set my signature, this fourteenth day of September A. D. 1852.

R. HINTON.

Witnesses:
R. H. EDDY,
GEORGE W. CUTLER.